US012234617B1

(12) United States Patent
Cheng et al.

(10) Patent No.: US 12,234,617 B1
(45) Date of Patent: Feb. 25, 2025

(54) CONSTRUCTION METHOD FOR FLOOD STORAGE AREA ECOLOGICAL WETLAND ORIENTED TO MULTI-TARGET COLLABORATIVE PROMOTION

(71) Applicants: ANHUI SURVEY & DESIGN INSTITUTE OF WATER RESOURCES & HYDROPOWER CO.,LTD., Hefei (CN); CHANGJIANG WATER RESOURCES PROTECTION INSTITUTE, Wuhan (CN)

(72) Inventors: Zhiyuan Cheng, Hefei (CN); Bo Jiang, Wuhan (CN); Tao Li, Hefei (CN); Fengchan Zhang, Hefei (CN); Ting Yu, Hefei (CN); Xiaoyuan Wang, Wuhan (CN); Zhenxin Li, Hefei (CN); Santao Xie, Hefei (CN); Siji Wang, Hefei (CN); Junfeng Li, Hefei (CN); Xinyi Zhang, Hefei (CN)

(73) Assignees: ANHUI SURVEY & DESIGN INSTITUTE OF WATER RESOURCES & HYDROPOWER CO., LTD., Hefei (CN); CHANGJIANG WATER RESOURCES PROTECTION INSTITUTE, Wuhan (CN)

( * ) Notice: Subject to any disclaimer, the term of this patent is extended or adjusted under 35 U.S.C. 154(b) by 0 days.

(21) Appl. No.: 18/811,847

(22) Filed: Aug. 22, 2024

(30) Foreign Application Priority Data

Dec. 26, 2023 (CN) .......................... 202311804692.0

(51) Int. Cl.
*E02B 3/02* (2006.01)
*A01G 22/22* (2018.01)
*E02B 8/02* (2006.01)

(52) U.S. Cl.
CPC ............... *E02B 3/02* (2013.01); *A01G 22/22* (2018.02); *E02B 8/02* (2013.01)

(58) Field of Classification Search
CPC ... E02B 3/00; E02B 3/02; E02B 13/00; A01G 22/22
See application file for complete search history.

(56) References Cited

FOREIGN PATENT DOCUMENTS

| CN | 106638512 A | * | 5/2017 |
| CN | 112850907 A | | 5/2021 |

(Continued)

*Primary Examiner* — Tara Mayo
*Assistant Examiner* — Tara Mayo-Pinnock
(74) *Attorney, Agent, or Firm* — Bayramoglu Law Offices LLC

(57) ABSTRACT

The provided is a construction method for a flood storage area ecological wetland oriented to multi-target collaborative promotion. The construction method includes: I. carrying out ecological wetland construction on a flood storage area by taking promotion of agricultural production as a goal; II. according to a water purification target of the flood storage area of the ecological wetland and a current pollution condition in the flood storage area, constructing the ecological wetland based on improvement of the water purification target when the flood storage area does not reach the water purification target at present; and III, in order to improve the biodiversity, carrying out the following ecological wetland construction on the flood storage area. In the method, agricultural production, water purification and biodiversity improvement of the flood storage area are comprehensively considered. The method is the most effective way for multi-target collaborative promotion of the flood storage area.

5 Claims, 1 Drawing Sheet

(56) References Cited

FOREIGN PATENT DOCUMENTS

| CN | 112875870 | A | | 6/2021 | | |
|---|---|---|---|---|---|---|
| CN | 113152354 | A | * | 7/2021 | ………… | A01G 17/005 |
| CN | 114349170 | A | | 4/2022 | | |
| CN | 115049302 | A | | 9/2022 | | |
| CN | 116663796 | A | | 8/2023 | | |

* cited by examiner

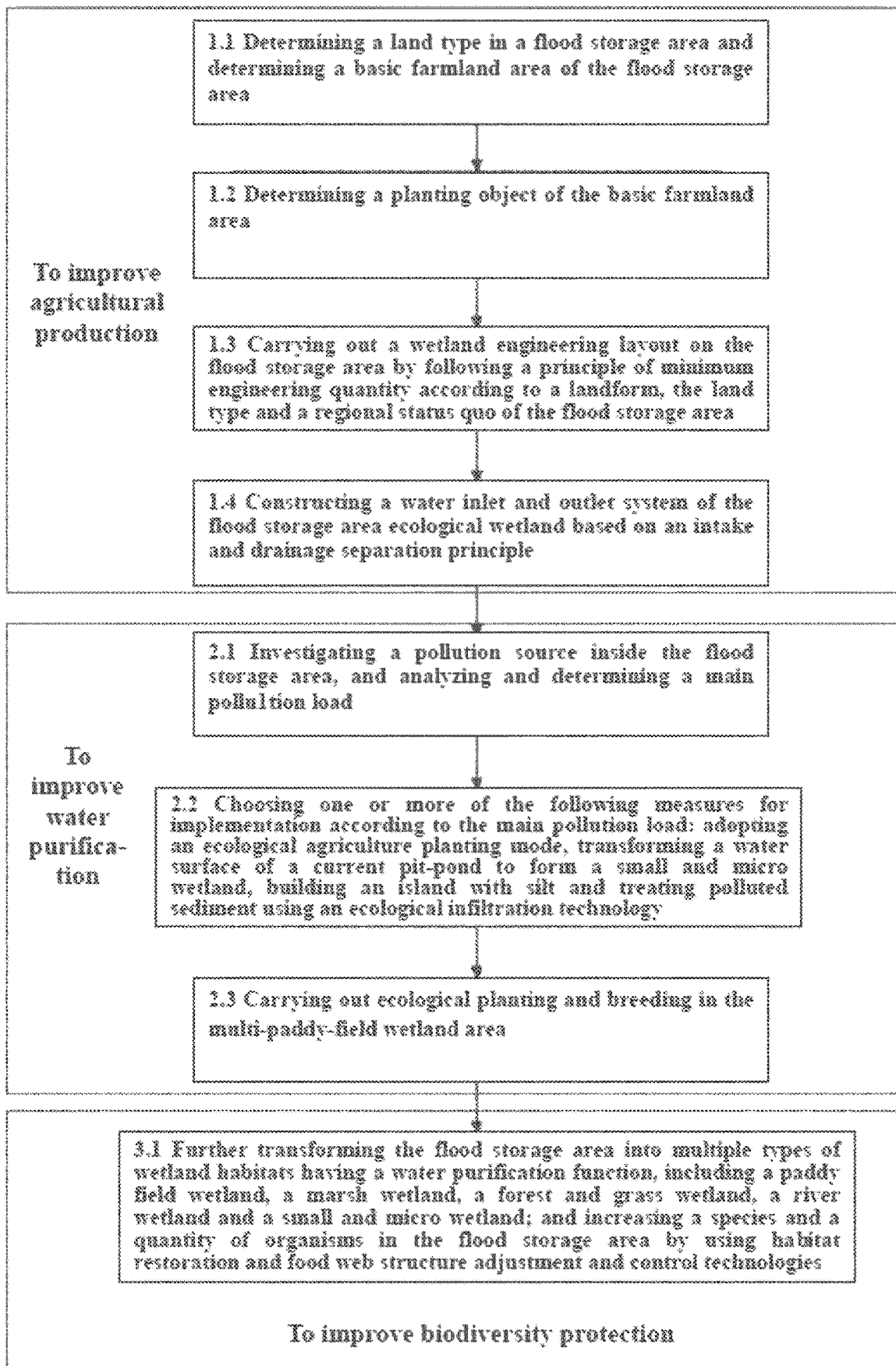

CONSTRUCTION METHOD FOR FLOOD STORAGE AREA ECOLOGICAL WETLAND ORIENTED TO MULTI-TARGET COLLABORATIVE PROMOTION

CROSS-REFERENCE TO THE RELATED APPLICATIONS

This application is based upon and claims priority to Chinese Patent Application No. 202311804692.0, filed on Dec. 26, 2023, the entire contents of which are incorporated herein by reference.

TECHNICAL FIELD

The present application belongs to the technical field of ecological management and particularly relates to a construction method for a flood storage area ecological wetland oriented to multi-target collaborative promotion.

BACKGROUND

Flood storage areas refer to low-lying areas, lakes, etc. outside downstream faces of river banks, which have the functions of temporary storage of floods and defense against excessive floods. Most flood storage areas are low-lying, and can, on the one hand, store excessive floods and cut down flood peaks when the basin suffers from excessive floods, and on the other hand, the flood storage areas are mostly agricultural production areas having important production functions. The followings are major problems faced by construction and management of the flood storage areas: how to not only ensure normal play of a flood storage role in case of excessive floods but also effectively improve the agricultural production function in the flood storage areas in case of no excessive floods, and at the same time, how to effectively improve a water purification function and a biodiversity protection function in the flood storage areas through water-system regulation and vegetation restoration.

SUMMARY

An objective of the present application is to provide a construction method for a flood storage area ecological wetland oriented to multi-target collaborative promotion. The present application proposes a flood storage area ecological wetland construction method, in which agricultural production, water purification and biodiversity improvement of the flood storage area are comprehensively considered.

In order to achieve the above objective, the present invention provides a construction method for a flood storage area ecological wetland oriented to multi-target collaborative promotion, including the following steps:

I. carrying out ecological wetland construction on a flood storage area by taking promotion of agricultural production as a goal:
1.1 determining a land type in the flood storage area and determining a basic farmland area of the flood storage area;
1.2 determining a planting object of the basic farmland area;
1.3 carrying out a wetland engineering layout on the flood storage area by following a principle of minimum engineering quantity according to a landform, a land type and a regional status quo of the flood storage area, the wetland engineering layout including: performing functional zoning on the flood storage area and transforming the basic farmland area into a terraced wetland; and
1.4 constructing a water inlet and outlet system of the flood storage area ecological wetland based on an intake and drainage separation principle;

II. performing the following ecological wetland construction steps when the flood storage area does not reach the water purification target at present according to a water purification target of the flood storage area of the ecological wetland and a current pollution condition in the flood storage area:
2.1 investigating a pollution source inside the flood storage area, and analyzing and determining a main pollution load;
2.2 choosing at least one of the following measures for implementation according to the main pollution load: adopting an ecological agriculture planting mode, transforming a water surface of a current pit-pond to form a small and micro wetland, building an island with silt and treating polluted sediment using an ecological infiltration technology; and
2.3 carrying out ecological planting and breeding in a multi-paddy-field wetland area; and III. performing the following ecological wetland construction steps in the flood storage area in order to improve the biodiversity:
3.1 in conjunction with the water inlet and outlet system constructed in step 1.4 and based on the wetland layout obtained in step 1.3, further transforming the flood storage area into multiple types of wetland habitats having a water purification function, including a paddy field wetland, a marsh wetland, a forest and grass wetland, a river wetland and a small and micro wetland; and increasing a species and a quantity of organisms in the flood storage area by using habitat restoration and food web structure adjustment and control technologies.

In some specific embodiments, determining the planting object of the basic farmland area in step 1.2 includes:
determining a planting object of the basic farmland area by following policies related to basic farmlands in China according to a climate and an environment of the flood storage area.

In some specific embodiments, in step 1.3, performing functional zoning on the flood storage area in step 1.3 includes:
taking a low-lying area where rice is planted as a multi-paddy-field wetland area, a low-lying area being a water surface as a small and micro wetland, and a high-lying area as a forest and grass wetland area.

In some specific embodiments, transforming the basic farmland area into the terraced wetland in step 1.3 includes:
combining small fields into a large field, performing land leveling on fields with a land elevation difference of more than 20 cm, and providing nested ditches at preset intervals on an individual field with a length of more than 200 m.

Further, a filter material is laid in the nested ditch.

Further, transforming the basic farmland area into the terraced wetland further includes:
dredging original ditches in the field, such that the ditches are spaced at intervals of 100 m to 200 m, and a water intake canal and a water drainage canal are separated from each other.

In some specific embodiments, constructing the water inlet and outlet system of the flood storage area ecological wetland in step 1.4 includes:

constructing an overall water inlet and outlet system by:
using a total wetland water intake gate and a built river gate in the flood storage area for self-flow diversion of water, causing water to first enter a dike and settle and be purified in a stabilization pond, and then enter a wetland water distribution main canal to dispense water for each wetland unit from top to bottom, and finally, pumping and discharging purified river water back to an original river through a water drainage station;

and constructing a water inlet and outlet system inside the flood storage area: dredging a current water intake canal and a current water exhaust canal in the flood storage area, and distinguishing a water intake ditch from a water drain ditch; for an area where a water system fails to be communicated, connecting the ditches by means of excavation; providing a water inlet control sluice gate at a water inlet; and providing a water outlet control sluice gate at an outlet end of an outlet branch canal;

In some specific embodiments, adopting the ecological agriculture planting mode includes: laying pebbles at bottoms of a water inlet channel and a water outlet channel, sowing grass seeds in areas above normal water levels of the water inlet channel and the water outlet channel, restoring submerged vegetation in the water inlet channel and the water outlet channel each having a width greater than a preset width value, and restoring emergent vegetation on a side slope.

In some specific embodiments, ecological planting and breeding includes at least one of rice and crab co-breeding, rice and fish co-breeding, rice and *Procambarus clarkii* co-breeding, and rice and *Macrobrachium rosenbergii* co-breeding.

In some specific embodiments, further transforming the flood storage area into multiple types of wetland habitats having the water purification function includes:

restoring a paddy field wetland and a small and micro wetland in the multi-paddy-field wetland area; restoring a paddy field wetland and a small and micro wetland in the marsh wetland area; and restoring a paddy field wetland, a corn field, a small and micro wetland and a forest land in the forest and grass wetland area; and the small and micro wetland is obtained by transforming the water surface of the original pit-pond, a percolation weir is disposed in the small and micro wetland, and a substrate in the percolation weir includes zeolite with a particle size of 1 cm to 3 cm and limestone gravel with a particle size of 10 cm to 20 cm.

Compared with the prior art, the present application has the following advantages and beneficial effects.

1. In the method according to the present invention, agricultural production, water purification and biodiversity improvement of the flood storage area are comprehensively considered, and the method is the most effective way for multi-target collaborative promotion of the flood storage area and can scientifically guide the construction of the flood storage area of the ecological wetland.
2. The present application solves the problem of water system connection in the flood storage area and can meet flow requirements of different units.
3. The method according to the present invention is systematic, comprehensive and operable, and is applicable in different flood storage areas.

BRIEF DESCRIPTION OF THE DRAWINGS

The FIGURE is a schematic flow chart of a method according to the present application.

DETAILED DESCRIPTION OF THE EMBODIMENTS

The technical solutions in the embodiments of the present application will be described clearly and completely with reference to the accompanying drawings. Obviously, the described embodiments are only some of the embodiments of the present application, rather than all of the embodiments. According to the embodiments of the present application, all other embodiments obtained by those of ordinary skill in the art without consuming any creative work fall within the protection scope of the present application.

An objective of the present application is to construct a flood storage area ecological wetland, and a flood storage area can operate as an ecological wetland in the case of no excessive floods. In the present application, the construction method for the flood storage area ecological wetland aims at improving agricultural production, water purification and biodiversity protection.

The method provided by the present application will be described in detail below with reference to specific embodiments.

I. To Improve Agricultural Production.

1.1 A land type in a flood storage area is obtained according to survey data of land resources.

In transformation of the flood storage area, the area and the spatial distribution of a basic farmland area shall remain unchanged as a principle, except for necessary engineering construction land in the flood storage area. For example, in order to ensure the safety of flood storage in the flood storage area, it is necessary to occupy the basic farmland area for dike reinforcement and construction of flood-invading and flood-retreating buildings. The basic farmland area may be occupied under the premise of legality.

1.2 A planting object of the basic farmland area is determined by following policies related to basic farmlands in China according to a climate and an environment of the flood storage area.

Taking a Shiba Lianwei flood storage area as an example, its internal basic farmland area is 20,000 mu, accounting for about 50% of the total area of 41,400 mu of Shiba Lianwei. The planting objects identified in this basic farmland area include rice and corn.

1.3 A wetland engineering layout of the flood storage area is carried out in line with local conditions by following a principle of minimum engineering quantity according to a landform, a land type and a regional status quo of the flood storage area. The regional status quo includes original river system distribution, planted vegetation, and building conditions of the flood storage area.

Based on overall positioning of the flood storage area of the ecological wetland, on the basis of satisfying a flood storage function and according to the existing farmland texture and water system ditch layout in the flood storage area, the ecological wetland and the ecological agriculture are combined, by the measures of farmland water system connection, small and micro wetland construction and water ecosystem restoration, thereby enriching the wetland biodiversity and serving a purification function of bypass wetlands while maintaining a certain grain yield. Specifically, a low-lying area where rice is planted is taken as a multi-paddy-field wetland area, a low-lying area being a water surface is taken as a small and micro wetland, and a high-lying area is taken as a forest and grass wetland area.

Then, for solving the problems of different original farmland ownerships, different field sizes, uneven field heights, the same channel for water inlet and outlet, and low agricultural efficiency in the flood storage area, the basic farmland area in the flood storage area is transformed as follows.

First of all, land leveling is performed on the field to form a multi-stage terraced wetland with drop-offs, including but not limited to:
(1) small fields with small widths are combined into a large field, and the combined field should be controlled to 100 m to 200 m in length, 100±10 m in width and 1.5 $hm^2$ to 2.5 $hm^2$ in area, the field with a small width referring to a field with a width less than 100±10 m;
(2) land leveling is performed on the field with a land elevation difference of more than 20 cm; and
(3) for individual fields of greater lengths, nested ditches are disposed in a paddy field at preset intervals (for example, 100 m) to increase the uniformity of water distribution, the individual field of a greater length referring to a field with a length greater than 200 m.

In a preferred solution, a filter material (for example, zeolite) is laid in the nested ditch to remove nitrogen and phosphorus from water.

In this embodiment, the nested ditch is 3 m in width and 0.6 m in depth, gabion boxes are disposed on two sides of the nested ditch; and inside the nested ditch, zeolite with a particle size of 4 cm to 6 cm is laid on two sides, and zeolite with a particle size of 1 cm to 3 cm is laid in the middle.

Secondly, original ditches in the field are dredged, such that the ditches are spaced at intervals of 100 m to 200 m, and a water intake canal and a water exhaust canal are separated from each other.

By adopting the above measures, the original texture of low-lying paddy fields surrounded with dikes can be preserved to the greatest extent, and at the same time, the agricultural production efficiency and the agricultural production output can be improved.

1.4 A water inlet and outlet system of the flood storage area ecological wetland is constructed based on an intake and drainage separation principle.

In this embodiment, an overall water inlet and outlet system in the flood storage area is designed in the following way: using a total wetland water intake gate and a built river gate of the flood storage area for self-flow diversion of water, causing water to first enter a dyke and settle and be purified in a stabilization pond, and then enter a wetland water distribution main canal to dispense water for each wetland unit from top to bottom, and finally, pumping and discharging purified river water back to an original river through a water drainage station.

In this embodiment, an water inlet and outlet system of an internal unit is designed in the following way: dredging a current water intake canal and a current water exhaust canal, and distinguishing a water intake ditch from a water drain ditch; for an area where a water system fails to be communicated, connecting the ditches by means of excavation to ensure smooth water inlet and outlet; providing a water inlet control sluice gate at a water inlet to control the water intake; and providing a water outlet control sluice gate at a water outlet end of a water outlet branch canal to control a water level of the wetland. A total of 63 water inlet branch canals with a total length of 55.6 km and 42 water outlet branch canals with a total length of 43.1 km are provided.

II. To Improve Water Purification.

According to the water purification target of the flood storage area of the ecological wetland and the current pollution situation inside the flood storage area, the design process and the overall layout of the wetland are determined. When the pollution load inside the flood storage area is high and the water purification target is not reached, the purification capacity may be affected and the pollution load inside the flood storage area needs to be reduced. Then, the following ecological wetland construction steps are executed.

2.1 A pollution source is investigated inside the flood storage area, the water quality of ditches of pit-ponds inside is monitored, and a main pollution load is analyzed.

2.2 One or more of the following measures is chosen for implementation according to the main pollution load in a dike: adopting an ecological agriculture planting mode to reduce emissions from the source; transforming a water surface of an existing pit-pond to form a small and micro wetland, and reducing a pollution load nearby; and building an island with silt and treating polluted sediment with an ecological infiltration technology to reduce endogenous pollution in situ.

In this embodiment, the main pollution load in the flood storage area comes from agriculture, so the ecological agriculture planting mode is implemented in the flood storage area. Specifically, adopting the ecological agriculture planting mode includes: laying pebbles at bottoms of a water inlet channel and a water outlet channel, sowing grass seeds in areas above normal water levels of the water inlet channel and the water outlet channel, restoring submerged vegetation in the water inlet channel and the water outlet channel having greater widths, and restoring emergent vegetation on a side slope.

In this embodiment, the particle size of the laid pebbles is 1 cm to 2 cm and the thickness of laying is 0.2 m. The grass seeds are selected from one or more of Bermuda grass, alfalfa, *Zoysia japonica*, ryegrass and tall fescue, with a specification of 15 $g/m^2$; the submerged vegetation is selected from one or more of *Vallisneria spiralis*, *Potamogeton crispus* L., *Myriophyllum spicatum*, *Hydrilla verticillata*, *Potamogeton malaianus*, *Potamogeton pectinatus*, *Potamogeton maackianus* and *Ceratophyllum demersum*; and the emergent vegetation is selected from one or more of reed, lotus, bamboo reed, *Pontederia cordata*, *Iris pseudacorus* L., and *Iris sibirica*.

An original water inlet channel and an original water outlet channel in the flood storage area are desilted and dredged to ensure a water-passing function of the original water inlet channel and the original water outlet channel; and for an area with insufficient cross-section, the water passability is ensured by means of expanding excavation and creating a new channel, and herbaceous and aquatic plants, etc. are planted according to the function and the water level of the channel to add a purification function to the channel.

2.3 Ecological planting and breeding is carried out in a purification area of the multi-paddy-field wetland, including but not limited to rice and crab co-breeding, rice and fish co-breeding, rice and *Procambarus clarkii* co-breeding, and rice and *Macrobrachium rosenbergii* co-breeding, such that the use of pesticides and fertilizers can be reduced on a large scale to reduce the risk of pollution.

III. To Improve the Biodiversity.

In conjunction with the water inlet and outlet system constructed in step 1.4, the existing paddy fields, lotus root ponds, and ditches in the flood storage area are transformed into wetlands having the water purification function, and diversified and healthy wetland systems are created by using habitat restoration and food web structure adjustment and control technologies to increase the species and the quantity of organisms in the flood storage area. Multiple types of wetland habitats include, but are not limited to, a paddy field wetland, a marsh wetlands, a forest and grass wetland, a river wetland and a small and micro wetland.

In this embodiment, the functional zoning in the flood storage area includes a multi-paddy-field wetland area, a marsh wetland area and a forest and grass wetland area. 158 $hm^2$ of paddy field wetland and 12.5 $hm^2$ of small and micro wetland are restored in the multi-paddy-field wetland area. 239 $hm^2$ of paddy field wetland and 8.6 $hm^2$ of small and micro wetland are restored in the marsh wetland area. 414.1 $hm^2$ of paddy field wetland, 145.1 $hm^2$ of corn field, 44.3 $hm^2$ of small and micro wetland and 13.4 $hm^2$ of forest field are restored in the forest and grass wetland area. The small and micro wetland is mainly obtained by transforming the water surface of the original pit-pond, including: desilting, topographic finishing, water system connection, revetment construction, substrate laying, vegetation restoration and aquatic animal restoration.

The small and micro wetland is obtained by transforming the water surface of the original pit-pond, and can be used for purifying agricultural non-point source pollution. At the bottom of the small and micro wetland, yellow sand with a thickness of 0.06 m and zeolite with a thickness of 0.02 m are laid, in which the yellow sand is medium-coarse sand, and the zeolite has a particle size of 1 cm to 3 cm, a specific surface area of more than 8 $m^2/g$, and a porosity of more than 32%. Infiltration weirs are provided in some small and micro wetlands for water purification. The substrate in the infiltration weir includes zeolite with a particle size of 1 cm to 3 cm and limestone gravel with a particle size of 10 cm to 20 cm.

The revetment of the small and micro wetland may be in the form of a variety of a natural revetment, a wooden pile revetment, a gabion revetment, a riprap revetment and a sandy revetment, which can create diversified habitat conditions.

Planting different types of aquatic plants in open water inside the small and micro wetland can increase the plant diversity in the small and micro wetland and provide habitats for different types of aquatic animals and plants. Wet herbs are planted above the normal water level, mainly selected from Bermuda grass, alfalfa, *Zoysia japonica*, ryegrass, tall fescue, *Arundo donax* var *versicolor, Chinese pennisetum, Cyperus alternifolius, Iris sibirica*, etc.

At the initial stage of project construction, an appropriate amount of benthic organisms are put in as an initiating factor of a healthy water ecosystem. The density of the benthic organisms is 5 $g/m^2$ based on the amount of water at the normal water level, and the species of the benthic organisms are *Bellamya aeruginosa* and *Hyriopsis cumingii*.

Note: the above descriptions are merely preferred embodiments of the present application and the applied technical principles. It will be appreciated by those skilled in the art that the present application is not limited to the specific embodiments described herein, and that various obvious changes, readjustments and substitutions can be made by those skilled in the art without departing from the protection scope of the present application. Therefore, although the present application has been described in detail through the above embodiments, the present application is not limited to the above embodiments, but may also include more other equivalent embodiments without departing from the concept of the present application, all of which fall within the protection scope of the present application.

What is claimed is:

1. A construction method for a flood storage area ecological wetland oriented to multi-target collaborative promotion, comprising the following steps:
   a) carrying out ecological wetland construction on a flood storage area by taking promotion of agricultural production as a goal:
   b) determining a land type in the flood storage area and determining a basic farmland area of the flood storage area;
   c) determining a planting object of the basic farmland area;
   d) carrying out a wetland engineering layout on the flood storage area by following a principle of minimum engineering quantity according to a landform, a land type and a regional status quo of the flood storage area, the wetland engineering layout comprising: performing functional zoning on the flood storage area and transforming the basic farmland area into a terraced wetland; the regional status quo comprising original river system distribution, planted vegetation, and building conditions of the flood storage area;
   the step of performing the functional zoning on the flood storage area in step d) comprises:
      taking a low-lying area where rice is planted as a multi-paddy-field wetland area, a low-lying area being a water surface as a small and micro wetland, and a high-lying area as a forest and grass wetland area;
   the step of transforming the basic farmland area into the terraced wetland in step d) comprises: combining small fields into a large field, carrying out land leveling on a field with a land elevation difference of more than 20 cm, disposing nested ditches at preset intervals on an individual field with a length of more than 200 m, and dredging original ditches in the field, wherein the ditches are spaced at intervals of 100 m to 200 m, and a water intake canal and a water exhaust canal are separated from each other;
      disposing gabion boxes on two sides of the nested ditch; and inside the nested ditch, laying a first zeolite with a size of 4 cm to 6 cm on two sides, and laying a second zeolite with a size of 1 cm to 3 cm in a middle;
   e) constructing a water inlet and outlet system of the flood storage area ecological wetland based on an intake and drainage separation principle;
   the step of constructing the water inlet and outlet system of the flood storage area ecological wetland in step e) comprises:
      constructing an overall water inlet and outlet system by: using a total wetland water intake gate and a built river gate in the flood storage area for self-flow diversion of water, causing water to first enter a dike and settle and be purified in a stabilization pond, and then enter a wetland water distribution main canal to dispense water for each wetland unit from top to bottom, and finally, pumping and discharging purified river water back to an original river through a water drainage station; and
      constructing a water inlet and outlet system inside the flood storage area: dredging a current water intake canal and a current water exhaust canal of the flood storage area, and distinguishing a water intake ditch from a water drain ditch; for an area where a water system fails to be communicated, connecting the ditches by means of excavation; providing a water inlet control sluice gate at a water inlet; and providing a water outlet control sluice gate at a water outlet end of a water outlet branch canal;

f) constructing the flood storage area ecological wetland when the flood storage area does not reach the water purification target at present according to a water purification target of the flood storage area of the flood storage area ecological wetland and a current pollution condition in the flood storage area:

g) investigating a pollution source inside the flood storage area, and analyzing and determining a main pollution load;

h) choosing at least one of the following measures for implementation according to the main pollution load: adopting an ecological agriculture planting mode, transforming a water surface of a current pit-pond to form a small and micro wetland, building an island with silt and treating polluted sediment using an ecological infiltration technology; and h) carrying out ecological planting and breeding in the multi-paddy-field wetland area;

i) carrying out the following ecological wetland construction on the flood storage area in order to improve biodiversity:

j) in conjunction with the water inlet and outlet system constructed in step e) and based on the wetland engineering layout obtained in step d), further transforming the flood storage area into multiple types of wetland habitats having a water purification function, comprising a paddy field wetland, a marsh wetland, a forest and grass wetland, a river wetland and a small and micro wetland; and increasing a species and a quantity of organisms in the flood storage area by using habitat restoration and food web structure adjustment and control technologies;

the step of further transforming the flood storage area into the multiple types of wetland habitats having the water purification function comprises:

restoring a paddy field wetland and a small and micro wetland in the multi-paddy-field wetland area; restoring a paddy field wetland and a small and micro wetland in the marsh wetland; and restoring a paddy field wetland, a corn field, a small and micro wetland and a forest land in the forest and grass wetland area; wherein the small and micro wetland is obtained by transforming the water surface of the original pit-pond, a percolation weir is disposed in the small and micro wetland, and a substrate in the percolation weir comprises zeolite with a size of 1 cm to 3 cm and limestone gravel with a size of 10 cm to 20 cm.

2. The construction method for the flood storage area ecological wetland oriented to multi-target collaborative promotion according to claim 1, wherein the step of determining the planting object of the basic farmland area in step b) comprises:

determining a planting object of the basic farmland area by following national policies related to basic farmlands according to a climate and an environment of the flood storage area.

3. The construction method for the flood storage area ecological wetland oriented to multi-target collaborative promotion according to claim 1, wherein a filter material is laid in the nested ditch.

4. The construction method for the flood storage area ecological wetland oriented to multi-target collaborative promotion according to claim 1, wherein the step of adopting the ecological agriculture planting mode comprises: laying pebbles at bottoms of a water inlet channel and a water outlet channel, sowing grass seeds in areas above normal water levels of the water inlet channel and the water outlet channel, restoring submerged vegetation in the water inlet channel and the water outlet channel each having a width greater than a preset width value, and restoring emergent vegetation on a side slope.

5. The construction method for the flood storage area ecological wetland oriented to multi-target collaborative promotion according to claim 1, wherein the ecological planting and breeding comprises at least one of rice and crab co-breeding, rice and fish co-breeding, rice and *Procambarus clarkii* co-breeding, and rice and *Macrobrachium rosenbergii* co-breeding.

* * * * *